US006846585B2

(12) United States Patent
Robb et al.

(10) Patent No.: US 6,846,585 B2
(45) Date of Patent: Jan. 25, 2005

(54) METHOD FOR QUICK START-UP OF A FUEL PROCESSING SYSTEM USING CONTROLLED STAGED OXIDATION

(75) Inventors: Gary M. Robb, Lima, NY (US); William H. Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 531 days.

(21) Appl. No.: 10/093,560

(22) Filed: Mar. 8, 2002

(65) Prior Publication Data

US 2003/0170510 A1 Sep. 11, 2003

(51) Int. Cl.[7] .............................................. H01M 8/18
(52) U.S. Cl. ............................. 429/20; 429/17; 429/24; 429/26; 429/19; 429/13
(58) Field of Search ........................... 429/17, 20, 24, 429/26, 19, 13

(56) References Cited

U.S. PATENT DOCUMENTS

| 4,650,727 | A | 3/1987 | Vanderborgh et al. |
| 6,077,620 | A | 6/2000 | Pettit |
| 6,232,005 | B1 | 5/2001 | Pettit |
| 6,524,550 | B1 * | 2/2003 | Chintawar et al. .......... 423/650 |
| 2003/0093950 | A1 | 5/2003 | Goebel et al. |

OTHER PUBLICATIONS

Notification of Transmittal Of The International Search Report Or The Declaration, dated Aug. 1, 2003.

* cited by examiner

Primary Examiner—Patrick Ryan
Assistant Examiner—Angela J. Martin
(74) Attorney, Agent, or Firm—Harness, Dickey & Pierce, P.L.C.

(57) ABSTRACT

The present invention relates to controlled staged rich combustion throughout a fuel processing system in order to improve start up performance. Multiple stages of air injection are used to burn rich combustion products within each component to provide direct heating thereof. During the start up cycle, the fluid temperature entering each reactor is increased and each component is heated to its operating temperature in parallel. The controlled staged rich combustion eliminates the load imposed upon a combustor within the system during the start up cycle. Thus, each of the components within the fuel processing system may be optimized for an operational mode rather than a start up mode.

30 Claims, 2 Drawing Sheets

METHOD FOR QUICK START-UP OF A FUEL PROCESSING SYSTEM USING CONTROLLED STAGED OXIDATION

FIELD OF THE INVENTION

The present invention relates to a method of operating a fuel processing system, and more particularly to a method using controlled staged oxidation throughout the fuel processing system in order to improve start-up performance.

BACKGROUND OF THE INVENTION

A fuel processing system often consists of many different components that all contribute to the production of a low carbon monoxide, hydrogen containing feed stream. The most common configuration of a fuel processing system employs auto thermal reforming or steam reforming in a Primary Reactor where air and/or steam are used for incomplete oxidation of the fuel to form $H_2$, $N_2$, CO, $CO_2$, $CH_4$ and $H_2O$. A water gas shift reactor and a preferential oxidation reactor then utilize steam and air in conjunction with the primary reactor effluent for oxidation of carbon monoxide to produce stack-grade hydrogen. Until stack-grade hydrogen is produced, effluent from the preferential oxidation reactor is diverted to a tail gas combustor wherein any remaining fuel products are completely oxidized.

A limiting factor for the initial production of stack-grade hydrogen from a fuel processing system is the ability to raise each component up to its operating temperature. The heat required to accomplish this task can be related to the mass of each component's active material or reactor bed; the heat capacity of each component as determined by the size and materials utilized therein; and the temperature rise required within each component from the ambient temperature to the desired operating temperature range.

Conventional fuel processing systems use a cascading heating scheme for start up. This scheme usually involves heating the primary reactor up to a threshold light off temperature followed by the introduction of a rich mixture of fuel and air, along with steam if available. This mixture is allowed to react up to its adiabatic temperature and the products are allowed to flow through the primary reactor, and then onto the remaining components in the fuel processing system—namely water gas shift, PrOx, combustor, etc. The fuel cell stack is bypassed in this mode, as the primary reactor products are high in carbon monoxide and all of the products are directed to the combustor where they are completely oxidized. The heat generated in the combustor is recovered to indirectly heat the components of the fuel processing system. Great efforts must be undertaken in the form of heat exchangers in order to transfer heat produced in the combustor to the other fuel processing components. In this scheme, the primary reactor pulls most of the heat of combustion out of the stream passing through until it reaches its operating temperature. During that period of time, little additional heat is available to raise the temperature of the downstream components. This progression continues down the stream of components where each reactor is heated in sequence until the whole system reaches an operating temperature.

In this scheme, the amount of fuel that can be burned in the primary reactor to provide heat for the fuel processing components is limited by the sizing of the combustor. During normal operation (i.e. run mode), the fuel cell stack typically consumes 80%–90% of the hydrogen generated by the fuel processing components. This means that the combustor, during normal operation, should be sized to consume 10%–20% of the hydrogen produced. Therefore, without utilizing an oversized combustor, the heating of the fuel processor cannot exceed approximately 20% of full power.

Accordingly, the start up methods for conventional fuel processing systems are inadequate in that the sequential heating of the components increases the length of time necessary to reach a normal operating condition. Accordingly, there is a need in the art to provide a method for decreasing the start up time of a fuel processing system.

SUMMARY OF THE INVENTION

In accordance with the present invention, a controlled staged rich oxidation is maintained throughout the fuel processing system in order to improve start up performance. In a preferred embodiment of the present invention, a number of air injection stages are used throughout the fuel processing system to burn rich combustion products therein. By burning rich combustion products within each component, heat is being generated at a location which directly heats the reactor bed. The temperature of the heating fluid may be maximized by adjusting the air to fuel ratio, limited only by the maximum operating temperature of the individual component. Thus, by "boosting" the fluid temperature entering each component the adverse effects of sequential cascading heating can be avoided, and each component may be brought to its operating temperature in parallel, thereby significantly reducing the start up time. Burning the rich combustion products within each component also alleviates the load requirements of the combustor, allowing for a greater rate of overall fuel conversion for heating through the use of full power level fuel flow instead of 20% fuel flow as in the conventional case. By directly heating the fuel processor components via oxidation of the rich combustion products, the heat exchange demands of the combustor exhaust are significantly reduced.

In accordance with the present invention, the controlled staged rich combustion for quick start up provides a method for burning the amount of fuel required to heat a fuel processor to operating temperature at a greater rate than for sequential cascaded heating.

In another aspect of the present invention, the controlled staged rich combustion permits start up in a reducing environment such that none of the reactor beds are exposed to oxygen during the start cycle, thus preserving the catalysts with pyrophoric formulations.

In a further aspect of the present invention, the temperature seen within any single component can be more precisely controlled to a point below the maximum allowable operating temperature.

In yet another aspect of the present invention, the controlled staged rich combustion reduces the concentrations of hydrogen and carbon monoxide throughout the system so that they are progressively oxidized to provide direct heating, rather than solely using the products of combustion as a heat carrier fluid.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
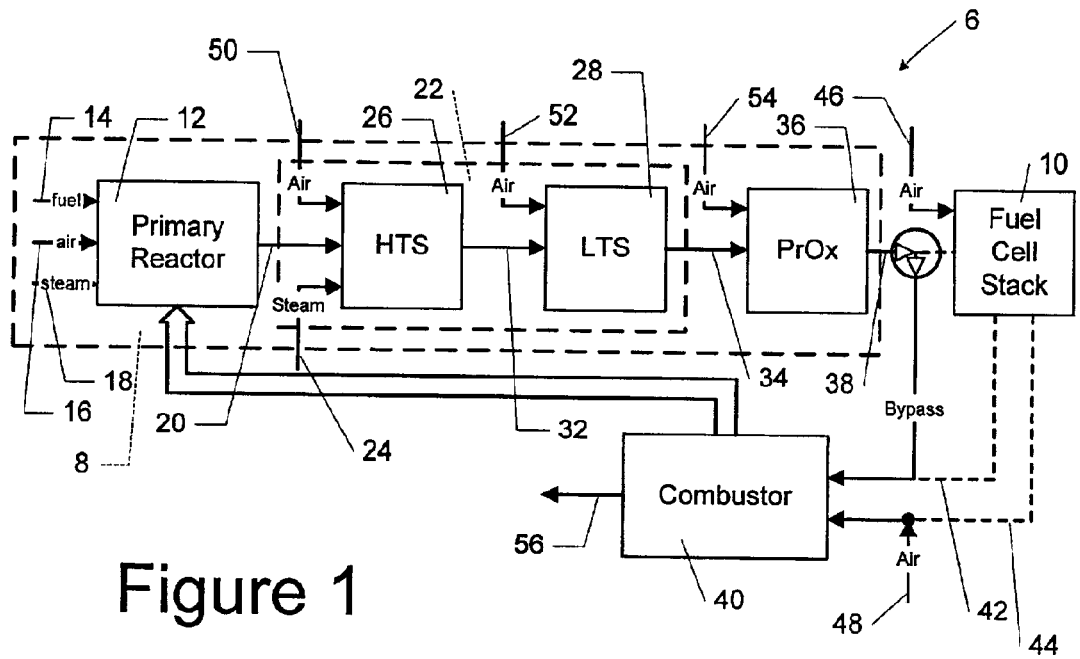
FIG. 1 is a schematic illustration of a fuel processing system adapted to employ the start-up method of the present invention.

FIG. 1 depicts a simplified fuel cell system 6 having a fuel processor 8 and a fuel cell stack 10 in accordance with the present invention. The fuel processor 8 includes a primary reactor 12 having a catalytic bed for reforming a hydrocarbon fuel stream 14, an air stream 16 and, preferably, water in the form of a steam stream 18 in a combination partial oxidation/steam reforming (i.e., autothermal reforming) reaction. The output of the primary reactor 12 is a reformate stream 20 which comprises principally hydrogen, nitrogen, water, carbon dioxide, carbon monoxide and traces of methane. The amount of air can be adjusted to provide the exotherm desired during any point in the operation of primary reactor 12. Likewise, the steam stream 18 can also be adjusted to control the temperature rise seen in the primary reactor 12. There is some level of control as to the relative concentrations of the products in the reformate stream 20. These concentrations are most closely controlled by the air stream 16 and steam stream 18, as well as the overall operating temperature of the primary reactor 12 itself, which typically operates in the range of 600° C. to 1,000° C. As such, the primary reactor 12 can require the greatest amount of heat during the start up period.

The carbon monoxide in the reformate stream 20 would be detrimental to a PEM fuel cell stack 10 if contact were allowed. Thus, it is necessary to remove much of the carbon monoxide products from the reformate stream 20 exiting the primary reactor 12 with a suitable CO clean up reactor or reactors, including but not limited to water gas shift reactors, preferential oxidation reactors, adsorption reactors, membrane reactors and combinations or equivalents thereof. As presently preferred a water gas shift reactor 22 is used to catalytically react carbon monoxide in the reformate stream 20 with the water carried in the reformate stream, and if available and necessary supplemental water in the form of a steam stream 24, to form additional carbon dioxide and hydrogen. The water gas shift reaction is often accomplished in a two stage shift reactor wherein the reformate stream 20 first passes through a high temperature shift reactor (HTS) 26 and then through a low temperature shift reactor (LTS) 28.

The conversion of carbon monoxide in the water gas shift reaction is generally limited by thermal dynamic equilibrium. Lower carbon monoxide levels can be achieved by operating at lower temperature. Low temperature operation decreases the overall rate of CO conversion which in turn requires a larger reactor for a given application. Thus, there is a balance to be maintained with respect to overall size (thermal mass) and operating temperature (heat required to achieve full activity). The use of a two stage shift reactor takes advantage of high temperature activity and low temperature approach to low equilibrium carbon monoxide concentrations. As shown, HTS 26 is an adiabatic or isothermal shift reactor having a catalyst operable to effect the water gas shift reaction in the temperature range of about 300° C. to 450° C. Such catalysts can include iron oxide, chromium oxide or supported precious metals. As shown, LTS 28 is an adiabatic or isothermal shift reactor having a catalyst operable to effect the water gas shift reaction in the temperature range of 200° C. to 300° C. Such catalysts include Cu—ZnO or supported precious metals.

The reformate stream 34 exiting the water gas shift reactor 22 is typically still too high in carbon monoxide and temperature to be used directly in a PEM fuel cell stack 10. Accordingly, it is presently preferred to remove additional carbon monoxide and heat from the reformate stream 34 by way of an isothermal or adiabatic preferential oxidation (PrOx) reactor 36. In the PrOx reactor 36, an air stream 54 is preferentially reacted with the carbon monoxide (instead of the hydrogen) in the reformate stream 34 over a suitable catalyst that promotes such preferential oxidation. The rate of conversion of carbon monoxide in the preferential oxidation reactor 36 is controlled by chemical kinetics. Higher temperatures lead to increased rates of CO oxidation. Unfortunately, the reformate stream 34 feed to the PrOx reactor 36 also contains hydrogen that undergoes the catalytic oxidation reaction. The selectivity of CO oxidation over hydrogen oxidation can be increased, in many cases, by decreasing the operating temperature of the PrOx reactor 36. Here again, there is a fine balance between overall reaction rate and selectivity in sizing the PrOx reactor 36. Generally, the PrOx reactor 36 operates in the temperature range of 80° C. to 200° C.

While the presently preferred embodiment utilizes a WGS reactor 22 and a PrOx reactor 36 in combination, a skilled practitioner will recognize that other mechanizations are readily adaptable for use in the present invention to perform the CO clean up function of these components.

In the mechanization discussed above, the reformate and/or effluent streams exiting the primary reactor 12 and the CO clean up reactors (i.e., HTS 26, LTS 28 and PrOx 36) may be cooled before entering the next reactor downstream. Cooling of the reformate or effluent stream may be accomplished with a variety of approaches depending on the specific mechanization and operating parameters. Such approaches include but are not limited to heat exchange, liquid water addition, steam addition as well as combinations or equivalents thereof.

When a fuel processor 8 is operating under normal steady state conditions, the reformate stream 38 exiting the PrOx reactor 36 is sufficiently CO-free (i.e. less than about 0.00005 mole fraction CO) that it can be used in the fuel cell stack 10 without poisoning the catalyst, and is thus routed to an anode input of the fuel cell stack 10. Hydrogen which is not consumed in the fuel cell stack 10 is discharged as an anode effluent stream 42 to a tail gas combustor 40. Oxygen in the form of air is provided to a cathode inlet 46 of the fuel cell stack 10. Oxygen which is not consumed in the fuel cell stack 10 is routed to the combustor 40 as a cathode effluent stream 44. The anode effluent and cathode effluent are burned in the combustor 40 to consume any remaining fuel (usually in the form of hydrogen and methane with possible traces of CO and fuel fragments) in the anode effluent. The heat generated by the combustor 40 may be recovered for further use within the fuel processor 8, and in particular the primary reactor 12.

Within the fuel cell stack 10, approximately 80%–90% of the hydrogen is consumed to generate electricity and heat. The remaining hydrogen is subsequently consumed in the tail gas combustor 40. The tail gas combustor 40 can operate over a wide range of temperatures, while still consuming all of the hydrogen feed. Typically, the operating temperature of the tail gas combustor 40 is set so as to consume all methane and carbon monoxide that may make its way through the fuel cell system 6.

A limiting factor for the initial production of high grade hydrogen suitable for the fuel cell stack 10 from the fuel processor 8 is elevating the primary reactor 12, HTS 26, LTS 28 and PrOx 36 up to their respective operating temperatures. The heat required to accomplish this task is related to the mass of each of the components' active materials, the heat capacity of each component and the temperature rise required with each component. Since each of these properties is generally fixed for a given design of the fuel processing system 8, the heat required and thus the amount of fuel which needs to be either partially or completely oxidized in order to raise the system to its operating temperature can be calculated and is generally constant. Therefore, the rate at which this given amount of fuel can be oxidized (within some constraints) determines the start up time of the fuel processor.

In many applications such as vehicular applications a very short time period to obtain operating temperatures is necessary. In this regard, the fuel cell system 6 is adapted to utilize controlled staged rich combustion throughout the fuel processing system in order to improve start up performance. The fuel processor 8 uses multiple stages of air injection to burn rich combustion products within each of the components, namely the primary reactor 12, the HTS 26, LTS 28 and the PrOx 36. As used herein, rich combustion products can be taken to mean $H_2$, $N_2$, $CO$, $CO_2$, $H_2O$ and $CH_4$. By burning rich combustion products within each component during the start up cycle, heat is generated directly where it is needed. Furthermore, the temperature of the heating fluid may be maximized by adjusting the air to fuel ratio, limited only by the maximum operating temperature of the individual component in question.

The controlled staged rich combustion increases the fluid temperature resident within each component during the start up cycle, thereby eliminating the sequential cascading heating effects observed in conventional systems and allowing each component to be brought to its operating temperature in parallel. Furthermore, controlled staged rich combustion within each of the components alleviates the load requirements on the combustor 40, allowing for a greater rate of overall fuel conversion for heating. Stated in different terms, a full power level fuel flow may be utilized during the start up cycle instead of being limited to 20% power as in conventional systems because of combustor sizing limitations. As such, the extent of heat exchange needed with respect to the exhaust of the combustor 40 is reduced.

With reference again to FIG. 1, an air input is provided to the CO clean up reactors 26, 28, 36 in addition to the primary reactor 12 and combustor 40. Specifically, an air stream 50 provides staged air input to the HTS 26, air stream 52 provides staged air input to LTS 28 and air stream 54 provides staged air input into the PrOx 36. It is important to note that each of these CO clean up reactors must incorporate a catalyst which is capable of hydrogen and carbon monoxide oxidation following each stage of air addition. Most catalysts that are active for CO cleanup are also capable of hydrogen and carbon monoxide oxidation. In fact, some pyrophoric catalyst formulations can be used for this purpose with no observable degradation. For a case where the catalyst formulation is not capable of lightoff of rich combustion products, the reactor may include a lightoff section located in the front of the reactor which provides a localized source of thermal energy to rapidly activate the upstream portion of the reactor. Examples of a lightoff section can include, but are not limited to electrical heaters (EHs), electrical heated catalysts (EHCs), non-catalytic thermal devices (burners), catalytic lightoff beds, and combinations or equivalents thereof.

While each component is illustrated as having a single air stage, a skilled practitioner will recognize that the number of air stages and the relative air flow distribution between each stage can be optimized depending on the amount of thermal energy required by each component and the maximum operating temperature thereof. In this regard, the flow rates of each of the air stages can be controlled very simply using an active flow control which includes a mass flow meter and an active valve element in air streams 50, 52, 54. Alternately, a passive fixed metering device such as a sonic orifice or a fixed split orifice with a single active metering device could be employed in air streams 50, 52, 54 to control the introduction of air into each component.

Figure 2:
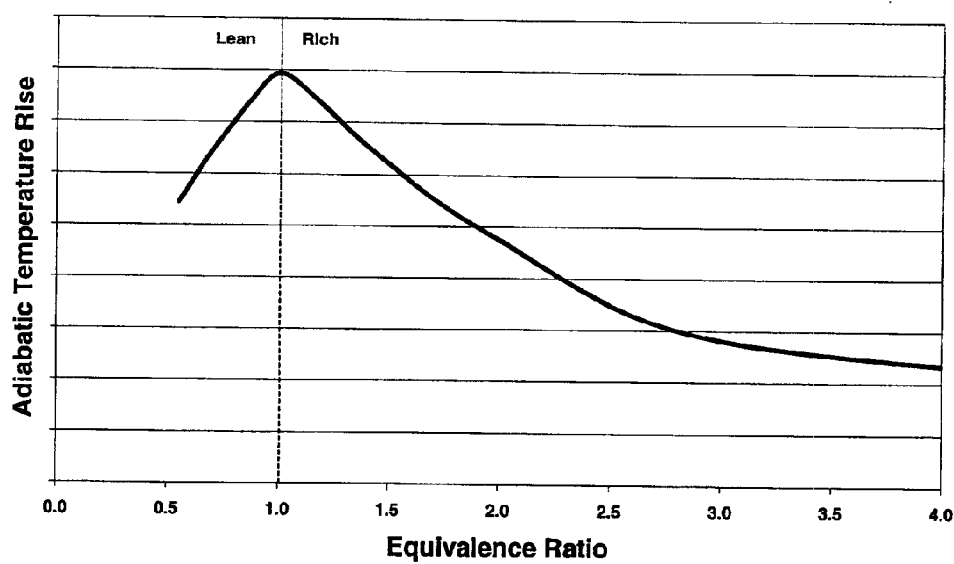
FIG. 2 is a graph illustrating the adiabatic temperature rise of a fuel processing component as a function of the equivalence ratio of the feed stream oxidized therein.

The staged rich combustion is controlled as a function of the equivalence ratio of a given reactor component. In this regard, the adiabatic temperature rise will be known for a given equivalence ratio which describes the deviation from stoichiometric combustion at which the particular component is operating. As illustrated in FIG. 2, the relationship between the equivalence ratio and the adiabatic temperature rise provides a characteristic function or curve for a given component. As the temperature of the inlet mixture and reactor bed rise with time, the equivalence ratio is adjusted by reducing the flow rate of the air stream or increasing the flow rate of the fuel stream to a given component so that the resulting temperature from the adiabatic temperature rise will not exceed the maximum operating temperature of such component.

The method for a quick start up of a fuel processing system using controlled staged rich oxidation will be described. It is important to note that rich combustion must be maintained throughout the fuel processing system so that fuel is available to downstream reactors as well as to protect pyrophoric catalysts within the components. Specifically, the rich combustion eliminates oxygen as a product, thereby maintaining a reducing environment around such pyrophoric formulations.

Figure 3:
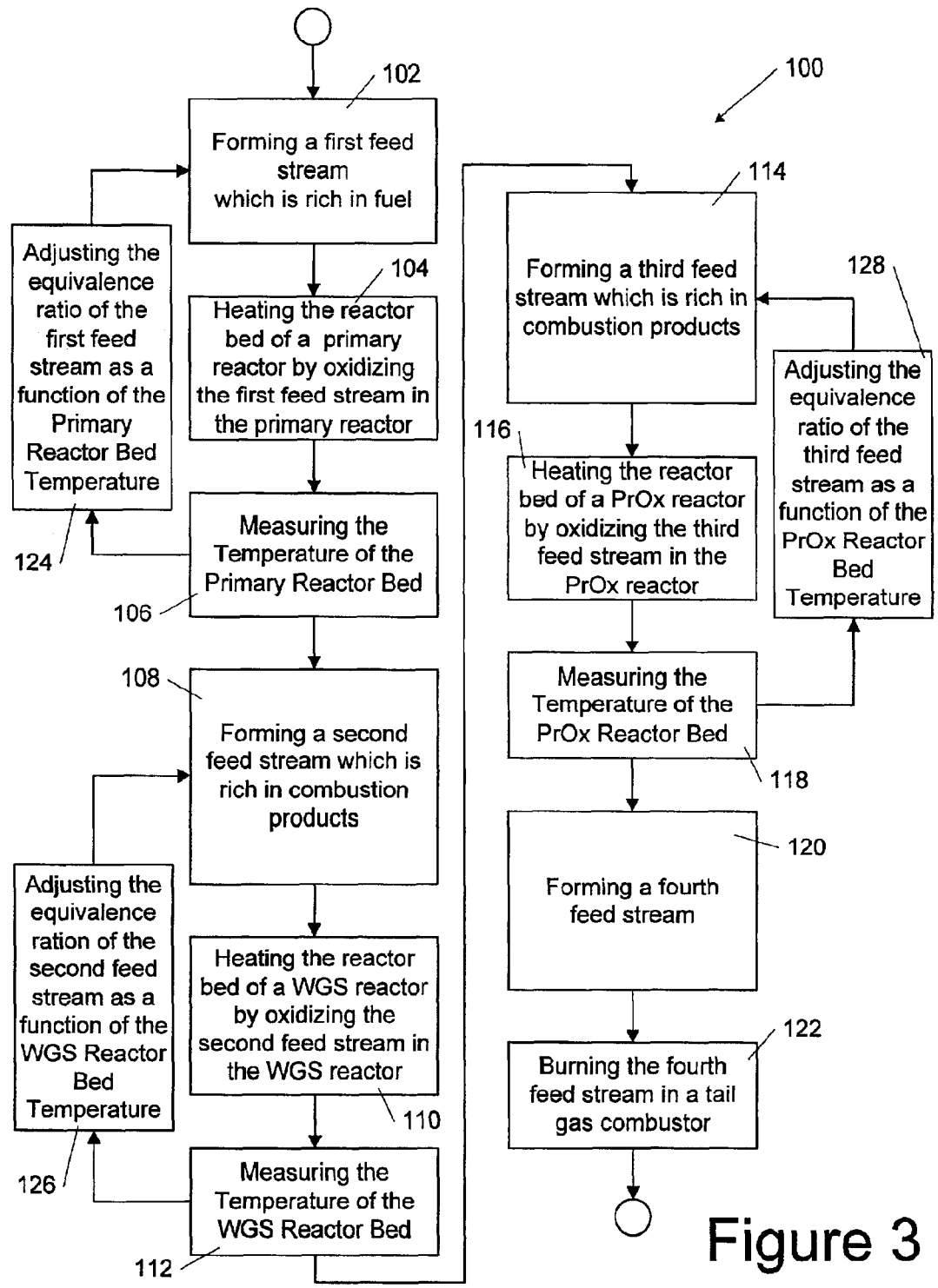
FIG. 3 is a flow chart illustrating the steps associated with start-up method of the present invention.

With reference now to FIG. 3, the method of quick start up in accordance with the present invention is schematically illustrated in flow chart 100. Initially, a first feed stream is formed by mixing the fuel stream 14, the air stream 16 and, if available, the steam stream 18 as indicated at block 102. An equivalence ratio greater than 1.0 must be maintained to preserve the reducing environment within the reactors and also to provide an effluent from primary reactor 12 which remains rich in combustion products. As used herein the equivalence ratio is defined as the following:

$$ER = \frac{\text{Air}/\text{Fuel}_{stoichiometric}}{\text{Air}/\text{Fuel}}$$

The first feed stream is passed through primary reactor 12 and oxidized therein as indicated at block 104. The reaction within primary reactor 12 is a partial oxidation reaction in which the hydrocarbon and oxygen within the first feed stream react to form rich combustion products. In addition, the heat generated during the partial oxidation reaction serves to directly heat the primary reactor catalyst bed. During the start up cycle, incomplete oxidation may result in unreacted hydrocarbon fuel and/or methane passing through the primary reactor 12. Thus, the effluent from primary reactor 12 can include primarily hydrogen and carbon monoxide with additional undesired hydrocarbon fuel fragments and methane. The temperature of the primary reactor 12 is monitored as indicated at block 106 so that the equivalence ratio of the first feed stream may be adjusted to prevent heating of the primary reactor 12 above its maximum operating temperature as indicated at block 124.

The effluent stream 20 from the primary reactor is combined with a second air stream 50 and, if available and required, a second water stream 24 to form a second feed stream which comprises of rich combustion products as indicated at block 108. The second feed stream 20 is passed through the water gas shift reactor 22 as indicated at block 110. Under normal operation, the water gas shift reactor 22 oxidizes carbon monoxide in the presence of steam. However, during the start up cycle, the catalyst within the water gas shift reactor is capable of oxidizing the hydrogen and carbon monoxide as well as possibly oxidizing the hydrocarbon fuel and methane. The heat of reaction generated within the water gas shift reactor directly heats the reactor bed of the water gas shift reactor. The temperature of the reactor bed in the water gas shift reactor 22 is monitored as indicated at block 112 so that the equivalence ratio of the second feed stream may be adjusted to prevent heating of the water gas shift reactor 22 above its maximum operating temperature as indicated at block 126.

The effluent emitted from the water gas shift reactor 22 is mixed with a third air stream 54 to form a third feed stream which is rich in combustion products as indicated at block 114. As with the second feed stream, the third feed stream includes primarily hydrogen and carbon monoxide with a balance of unreacted hydrocarbon fuel and methane. The third feed stream is passed through the PrOx reactor 36 where it undergoes an oxidation reaction as indicated at block 116. During the start up cycle, excessive hydrogen oxidation is not a concern, and in fact is desirable in that it provides additional heat of reaction which may be utilized to heat the reactor bed of the PrOx 36.

Once again, the third feed stream must be maintained slightly rich to provide fuel to the reactor and, in some cases, protect the catalytic elements therein. The temperature of the PrOx reactor bed is monitored as indicated at block 118 for further adjusting the equivalence ratio of the third feed stream as indicated at block 128. An effluent stream 38 is emitted from the PrOx reactor 36. Ideally, at this point during the start up cycle, all of the combustion products have been completely oxidized, thereby maximizing the heat generation within the fuel reforming system 8. As such, complete oxidation has occurred within the fuel processing system and no further oxidation need take place in the combustor 40. However, the PrOx reactor effluent stream 38 often contains a slight amount of combustion products, on the order of less than 20% of full power in order to maintain the oxygen-depleted, reducing atmosphere therein. Thus, during the start up cycle, the PrOx effluent stream 38 is bypassed around the fuel cell stack 10 and directed to the combustor 40. The effluent stream 38 from the PrOx reactor 36 is mixed with a fourth air stream 48 to form a fourth feed stream as indicated at block 120. The fourth feed stream is completely oxidized in the combustor 40 and a tail gas exhaust 56 is exhausted therefrom. The heat generated by the combustor 40 during the start up cycle may be utilized to indirectly heat components within the fuel processing system 8 such as primary reactor 12 or to condition the inlet streams 14, 16, 18 to the primary reactor in a conventional manner.

The ratio of the splits of air streams 16, 50, 52 and 54 should be equivalent to the contribution of each reactor (or reactor section) to the total heat required. More simply stated, reactors that require more total heat to achieve operating temperature will require more air. For example, consider a fuel processor where the primary reactor 12 requires 50% of the total heat for startup, the water gas shift reactors 26 and 28 require 20% of the total heat for startup and the PrOx reactor 36 require 30% of the total heat for startup. Here, 50% of the air being fed to the fuel processor 8 would go to the primary reactor 12, 20% would go to the water gas shift reactors 26 and 28, and 30% would be fed to the PrOx reactor 36. During the heating process, the split of air to each reactor should preferably remain constant so each reactor will reach its operating temperature at approximately the same time. The preferred result of the staged rich oxidation startup is an overall stoichiometric oxidation of fuel within the fuel processor where no fuel would be present in the combustor feed. This situation is ideal because all heating takes place directly on the catalyst beds and therefore no indirect heating need take place. As the reactors are heated closer to their respective temperature limits, however, the total amount of air flow must be reduced to a level where the equivalence ratio is greater than 1. One way to prolong near stoichiometric combustion within the fuel processor is to stage the air within a given reactor. The additional air stages allow a high level of energy input for a reactor without exceeding its temperature limit by spreading out the temperature rise. Eventually, the fuel processor will approach its full operating temperature, the air input will be reduced and fuel will make its way to the combustor.

If the fuel processor heating has been effective, the exhaust 38 of the fuel processor 8 will consist of stack grade hydrogen. This hydrogen can then be consumed in the stack in order to generate electricity thus reducing the amount of fuel actually making its way to the combustor. For example, early in the startup the equivalence ratio within the fuel processor 8 would be maintained at or slightly above 1.0. However, as the fuel processor 8 is heated, the air being added is reduced to provide an equivalence ratio of 2.0, then 3.0 and so on until operating temperature is achieved. In many cases, it is desirable to add water (in the form of liquid or vapor) to the reactor feed streams during the startup process and especially during normal operation. The rate at which water can be added is usually dependent upon the capacity of the fuel processor to generate steam. As the fuel processor is heated, its ability to generate steam also increases. Thus, as the equivalence ratio is decreased water can also be added to encourage some reaction and to manage heat being produced within the fuel processor and thereby avoid reactor overtemperature. An amount of air which would provide an overall equivalence ratio of 1.0 or less must subsequently be provided to the combustor (in the form of supplemental combustor air 48) in order to achieve complete conversion of the fuel.

As previously noted, the present invention employs a staged rich combustion of feed streams through the fuel processing system 8. In order to assure rich combustion, the present invention monitors the temperature of the reactor bed within each component and adjusts the equivalence ratio of the feed stream entering that component at or above 1.0 based upon the adiabatic temperature rise. For example, the temperature measurement of the primary reactor bed measured at block 106 is utilized in block 124 to adjust the equivalence ratio of the first feed stream. Similarly, the temperature of the reactor bed of the water gas shift reactor 22 is measured at block 112 and utilized at block 126 to adjust the equivalence ratio of the second feed stream. Similarly, the temperature of the reactor bed in the PrOx reactor 36 is measured at block 118 and utilized at block 128 to adjust the equivalence ratio of the third feed stream. In this manner, the thermal responses of the individual components are correlated to the adiabatic temperature rise within that component. Thus, the thermal characteristics of the components, including the mass of each components active material, the heat of capacity of each component and the temperature rise required within each component can be utilized to optimize their heating and minimize the time period required to bring each of the components of the fuel processing system 8 to its operating temperature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of heating a fuel processing system from an ambient temperature to an operating temperature using controlled staged rich oxidation in a fuel processing system to improve startup performance, the method comprising the steps of:

introducing a fuel stream and a first air stream into a primary reactor to form a first feed stream which is rich in fuel;

heating said primary reactor to a first operating temperature range by oxidizing at least a portion of said first feed stream in said primary reactor and forming a first effluent stream;

introducing said first effluent stream and a second air stream into a secondary reactor to form a second feed stream which is rich in combustion products; and heating said secondary reactor to a second operating temperature range by oxidizing at least a portion of said second feed stream in said secondary reactor and forming a second effluent stream.

2. The method of claim 1 wherein the step of introducing a fuel stream and a first air stream further comprises adjusting the equivalence ratio of said first feed stream such that the temperature of said primary reactor resulting from the adiabatic temperature rise will not exceed a maximum operating temperature of said primary reactor.

3. The method of claim 2 wherein the step of adjusting the equivalence ratio of said first feed stream further comprises adjusting said first air stream.

4. The method of claim 2 wherein the step of adjusting the equivalence ratio of said first feed stream further comprises adjusting said fuel stream.

5. The method of claim 1 wherein the step of introducing a first effluent stream and a second air stream further comprises adjusting the equivalence ratio of said second feed stream such that the temperature of said secondary reactor resulting from the adiabatic temperature rise will not exceed a maximum operating temperature of said secondary reactor.

6. The method of claim 5 wherein the step of adjusting the equivalence ratio of said second effluent stream further comprises adjusting said second air stream.

7. The method of claim 5 wherein the step of adjusting the equivalence ratio of said second effluent stream further comprises adjusting said first effluent stream.

8. The method of claim 1 wherein the step of introducing a first air stream further comprises introducing said first air stream in a plurality of stages within said primary reactor.

9. The method of claim 1 wherein the step of introducing a second air stream further comprises introducing said second air stream in a plurality of stages within said secondary reactor.

10. The method of claim 1 further comprising the steps of introducing a steam stream into a primary reactor along with said fuel stream and said first air stream to form a first feed stream which is rich in fuel.

11. The method of claim 1 further comprising the steps of:

introducing said second effluent stream and a third air stream into a combustor to form a third feed stream; and oxidizing said third feed stream in said combustor to form an exhaust stream which is discharged therefrom.

12. The method of claim 1 further comprising the steps of:

passing a portion of said second effluent stream through an anode side of a fuel cell stack;

passing a third air stream through a cathode said of said fuel cell stack;

reacting said portion of said second effluent stream and said third air stream in said fuel cell to generate electricity; and discharging an anode effluent and a cathode effluent from said fuel cell stack.

13. The method of claim 12 further comprising the steps of:

passing a first portion of said second effluent stream through said anode side of said fuel cell stack;

introducing a second portion of said second effluent stream, said anode effluent and a fourth air stream into a combustor to form a third feed stream; and oxidizing said third feed stream in said combustor to form an exhaust stream which is discharged therefrom.

14. A method of heating a fuel processing system from an ambient temperature to an operating temperature using controlled staged rich oxidation in a fuel processing system to improve startup performance, the method comprising the steps of:

introducing a fuel stream and a first air stream into a primary reactor to form a first feed stream which is rich in fuel;

heating said primary reactor to a first operating temperature range by oxidizing at least a portion said first feed stream in said primary reactor and forming a first effluent stream;

introducing said first effluent stream and a second air stream into a secondary reactor to form a second feed stream, said second feed stream being rich in combustion products and having an equivalence ratio such that the temperature of said secondary reactor will not exceed a maximum operating temperature thereof;

heating said secondary reactor to a second operating temperature range by oxidizing at least a portion of said second feed stream in said secondary reactor and forming a second effluent stream which has a lower CO concentration than said first effluent stream;

introducing said second effluent stream and a third air stream into a tertiary reactor to form a third feed stream, said third feed stream being rich in combustion products and having an equivalence ratio such that the temperature of said tertiary reactor will not exceed a maximum operating temperature thereof; and heating said tertiary reactor to a third operating temperature range by oxidizing at least a portion of said third feed stream in said tertiary reactor and forming a third effluent stream which has a lower CO concentration than said second effluent stream.

15. The method of claim 14 wherein the step of introducing a fuel stream and a first air stream further comprises adjusting the equivalence ratio of said first feed stream such that the temperature of said primary reactor resulting from the adiabatic temperature rise will not exceed a maximum operating temperature of said primary reactor.

16. The method of claim 15 wherein the step of adjusting the equivalence ratio of said first feed stream further comprises adjusting said first air stream.

17. The method of claim 15 wherein the step of adjusting the equivalence ratio of said first feed stream further comprises adjusting said fuel stream.

18. The method of claim 14 wherein the step of introducing a first effluent stream and a second air stream further comprises adjusting the equivalence ratio of said second feed stream such that the temperature of said secondary reactor resulting from the adiabatic temperature rise will not exceed a maximum operating temperature of said secondary reactor.

19. The method of claim 18 wherein the step of adjusting the equivalence ratio of said second effluent stream further comprises adjusting said second air stream.

20. The method of claim 18 wherein the step of adjusting the equivalence ratio of said second effluent stream further comprises adjusting said first effluent stream.

21. The method of claim 14 wherein the step of introducing a second effluent stream and a third air stream further comprises adjusting the equivalence ratio of said third feed stream such that the temperature of said tertiary reactor resulting from the adiabatic temperature rise will not exceed a maximum operating temperature of said tertiary reactor.

22. The method of claim 18 wherein the step of adjusting the equivalence ratio of said third effluent stream further comprises adjusting said third air stream.

23. The method of claim 18 wherein the step of adjusting the equivalence ratio of said third effluent stream further comprises adjusting said second effluent stream.

24. The method of claim 14 wherein the step of introducing a first air stream further comprises introducing said first air stream in a plurality of stages within said primary reactor.

25. The method of claim 14 wherein the step of introducing a second air stream further comprises introducing said second air stream in a plurality of stages within said secondary reactor.

26. The method of claim 14 wherein the step of introducing a third air stream comprises introducing said third air stream in a plurality of stages within said tertiary reactor.

27. The method of claim 14 wherein oxidizing at least a portion of said second feed stream comprises a water gas shift reaction.

28. The method of claim 27 wherein said water gas shift reaction further comprises a high temperature shift stage and a low temperature shift stage.

29. The method of claim 14 wherein oxidizing at least a portion of said third feed stream comprises a preferential oxidation reaction.

30. A method of heating a fuel processing system from an ambient temperature to an operating temperature using controlled staged rich oxidation in a fuel processing system to improve startup performance, the method comprising the steps of:

introducing a fuel stream and a first air stream into a primary reactor to form a first feed stream which is rich in fuel;

heating said primary reactor to a first operating temperature range by oxidizing at least a portion said first feed stream in said primary reactor and forming a first effluent stream;

introducing said first effluent stream and a second air stream into a high temperature water gas shift reactor to form a second feed stream, said second feed stream being rich in combustion products and having an equivalence ratio such that the temperature of said high temperature water gas shift reactor will not exceed a maximum operating temperature thereof;

heating said high temperature water gas shift reactor to a second operating temperature range by oxidizing at least a portion of said second feed stream in said high temperature water gas shift reactor and forming a second effluent stream;

introducing said second effluent stream and a third air stream into a low temperature water gas shift reactor to form a third feed stream, said third feed stream being rich in combustion products and having an equivalence ratio such that the temperature of said low temperature water gas shift reactor will not exceed a maximum operating temperature thereof;

heating said low temperature water gas shift reactor to a third operating temperature range by oxidizing at least a portion of said third feed stream in said low temperature water gas shift and forming a third effluent stream;

introducing said third effluent stream and a fourth air stream into a preferential oxidation reactor to form a fourth feed stream, said fourth feed stream being rich in combustion products and having an equivalence ratio such that the temperature of said preferential oxidation reactor will not exceed a maximum operating temperature thereof;

heating said preferential oxidation reactor to a fourth operating temperature range by oxidizing at least a portion of said fourth feed stream in said preferential oxidation reactor and forming a fourth effluent stream;

introducing said fourth effluent stream and a fifth air stream into a combustor to form a fifth feed stream; and oxidizing said fifth feed stream in said combustor to form an exhaust stream which is discharged therefrom.

* * * * *